US010462136B2

(12) United States Patent
Arregoces et al.

(10) Patent No.: US 10,462,136 B2
(45) Date of Patent: Oct. 29, 2019

(54) HYBRID CLOUD SECURITY GROUPS

(71) Applicant: Cisco Technology, Inc., San Jose, CA (US)

(72) Inventors: Mauricio Arregoces, Rancho Palos Verdes, CA (US); Nagaraj Bagepalli, San Jose, CA (US); Subramanian Chandrasekaran, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/881,649

(22) Filed: Oct. 13, 2015

(65) Prior Publication Data

US 2017/0104755 A1    Apr. 13, 2017

(51) Int. Cl.
*H04L 29/06* (2006.01)
*H04L 29/08* (2006.01)

(52) U.S. Cl.
CPC ............ *H04L 63/10* (2013.01); *H04L 63/102* (2013.01); *H04L 63/104* (2013.01); *H04L 67/10* (2013.01)

(58) Field of Classification Search
CPC . G06F 15/173; G06F 9/54; G06F 9/50; G06F 9/5072; G06F 9/541; G06F 21/6218; G06F 17/00; G06F 21/606; G06F 17/30; H04L 9/00; H04L 12/26; H04L 43/00; H04L 63/1408; H04L 63/1458; H04L 67/1008; H04L 43/10; H04L 63/0209; H04L 63/0218; H04L 63/1416; H04L 2029/06054; H04L 67/1029; H04L 67/1002; H04L 63/10; H04L 63/102; H04L 63/104; H04L 67/10; G08B 13/24; H04W 4/02; G01R 21/133

USPC ............ 726/1–4, 30, 15, 23, 26; 340/572.1; 455/456.1; 702/62
See application file for complete search history.

(56) References Cited

U.S. PATENT DOCUMENTS

| | | | |
|---|---|---|---|
| 5,812,773 | A | 9/1998 | Norin |
| 5,889,896 | A | 3/1999 | Meshinsky et al. |
| 6,108,782 | A | 8/2000 | Fletcher et al. |
| 6,178,453 | B1 | 1/2001 | Mattaway et al. |
| 6,298,153 | B1 | 10/2001 | Oishi |
| 6,343,290 | B1 | 1/2002 | Cossins et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

International Search Report and Written Opinion dated Dec. 9, 2016 for PCT App No. PCT/US2016/056648.

(Continued)

*Primary Examiner* — Thanhnga B Truong
(74) *Attorney, Agent, or Firm* — Polsinelli PC

(57) ABSTRACT

In one embodiment, a request may be received from a first cloud network of a hybrid cloud environment to transmit data to a second cloud network of the hybrid cloud environment, wherein the request can include a security profile related to the data. The security profile may be automatically analyzed to determine access permissions related to the data. Based at least in part on the access permissions, data can be allowed to access to the second cloud network.

20 Claims, 10 Drawing Sheets

(56) References Cited

U.S. PATENT DOCUMENTS

| | | |
|---|---|---|
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,606,147 B2 | 10/2009 | Luft et al. |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 * | 11/2013 | Nagpal ............... G06F 21/6218 713/164 |
| 8,611,356 B2 | 12/2013 | Yu et al. |
| 8,612,625 B2 | 12/2013 | Andries et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 * | 1/2015 | Roth ............... G06F 21/606 726/1 |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 * | 6/2015 | Beaty ............... G06F 9/5072 |
| 9,065,727 B1 | 6/2015 | Liu et al. |
| 9,075,649 B1 | 7/2015 | Bushman et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2002/0073337 A1 * | 6/2002 | Ioele ............... H04L 29/06 726/23 |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0095237 A1 | 5/2004 | Chen et al. |
| 2004/0131059 A1 | 7/2004 | Ayyakad et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |

(56) References Cited

U.S. PATENT DOCUMENTS

| | | |
|---|---|---|
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |

(56) References Cited

U.S. PATENT DOCUMENTS

| | | |
|---|---|---|
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0147297 A1 | 5/2017 | Krishnamurthy et al. |
| 2017/0171158 A1 | 6/2017 | Hoy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Beyer, Steffen, "Module "Data::Locations?!"," YAPC::Europe, London, UK,ICA, Sep. 22-24, 2000, XP002742700, 15 pages.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

Broadcasters Audience Research Board, "What's Next," http://lwww.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.

Cisco Systems, Inc., "Cisco Unified Network Services: Overcome Obstacles to Cloud-Ready Deployments," Cisco White Paper, Jan. 2011, 6 pages.

Cisco Systems, Inc., "Cisco Intercloud Fabric: Hybrid Cloud with Choice, Consistency, Control and Compliance," Dec. 10, 2014, 22 pages.

Cisco Technology, Inc., "Cisco Expands Videoscape TV Platform Into the Cloud," Jan. 6, 2014, Las Vegas, Nevada, Press Release, 3 pages.

CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.

Fang K., "LISP MAC-EID-TO-RLOC Mapping (LISP based L2VPN)," Network Working Group, Internet Draft, CISCO Systems, Jan. 2012, 12 pages.

Herry, William, "Keep It Simple, Stupid: OpenStack nova-scheduler and its algorithm", May 12, 2012, IBM, 12 pages.

Hewlett-Packard Company, "Virtual context management on network devices", Research Disclosure, vol. 564, No. 60, Apr. 1, 2011, Mason Publications, Hampshire, GB, Apr. 1, 2011, 524.

Juniper Networks, Inc., "Recreating Real Application Traffic in Junosphere Lab," Solution Brief, Dec. 2011, 3 pages.

Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.

Kolyshkin, Kirill, "Virtualization in Linux," Sep. 1, 2006, XP055141648, 5 pages, https://web.archive.org/web/20070120205111/http://download.openvz.org/doc/openvz-intro.pdf.

Lerach, S.R.O., "Golem," http://www.lerach.cz/en/products/golem, accessed Jul. 22, 2015, 2 pages.

Linthicum, David, "VM Import could be a game changer for hybrid clouds", InfoWorld, Dec. 23, 2010, 4 pages.

Naik, Vijay K., et al., "Harmony: A Desktop Grid for Delivering Enterprise Computations," Grid Computing, 2003, Fourth International Workshop on Proceedings, Nov. 17, 2003, pp. 1-11.

Nair, Srijith K. et al., "Towards Secure Cloud Bursting, Brokerage and Aggregation," 2012, 8 pages, www.flexiant.com.

Nielsen, "SimMetry Audience Measurement—Technology," http://www.nielsen-admosphere.eu/products-and-services/simmetry-audience-measurement-technology/, accessed Jul. 22, 2015, 6 pages.

Nielsen, "Television," http://www.nielsen.com/us/en/solutions/measurement/television.html, accessed Jul. 22, 2015, 4 pages.

Open Stack, "Filter Scheduler," updated Dec. 17, 2017, 5 pages, accessed on Dec. 18, 2017, https://docs.openstack.org/nova/latest/user/filter-scheduler.html.

Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.

Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

(56) References Cited

OTHER PUBLICATIONS

Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Amedro, Brian, et al., "An Efficient Framework for Running Applications on Clusters, Grids and Cloud," 2010, 17 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Ye, Xianglong, et al., "A Novel Blocks Placement Strategy for Hadoop," 2012 IEEE/ACTS 11th International Conference on Computer and Information Science, 2012 IEEE, 5 pages.

* cited by examiner

HYBRID CLOUD SECURITY GROUPS

TECHNICAL FIELD

The present technology pertains to computer-based networking, and more specifically, to security groups in a hybrid cloud environment.

BACKGROUND

Recent industry-wide shifts toward cloud-based service delivery and data consumption present new challenges for service providers to route and deliver data while providing security for data stored in private cloud databases. For example, cloud-based providers may employ various real-time adjustment models to efficiently adapt and allocate network resources based on changing security needs. Furthermore, a hybrid cloud computing and storage environment can present added challenges for network security as some portions of a hybrid cloud computing and storage environment may be accessible to a public forum and other portions of a hybrid cloud may be designated for a private forum.

A hybrid cloud computing environment can be a target for unauthorized access to data stored in the hybrid cloud as potential security threats may attempt to penetrate vulnerabilities that can be associated with a hybrid cloud computing and storage environment. Emerging computer-based threats are accelerating a need for increasingly flexible and secure network operations. As data, software, services, applications, and databases are increasingly tied to cloud-based networks, added security functionality and flexibility is desired in cloud-based computing environments, including hybrid cloud computing and storage environments.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which.

A component or a feature that is common to more than one drawing is indicated with the same reference number in each of the drawings.

DESCRIPTION OF EXAMPLE EMBODIMENTS

Figure 1:
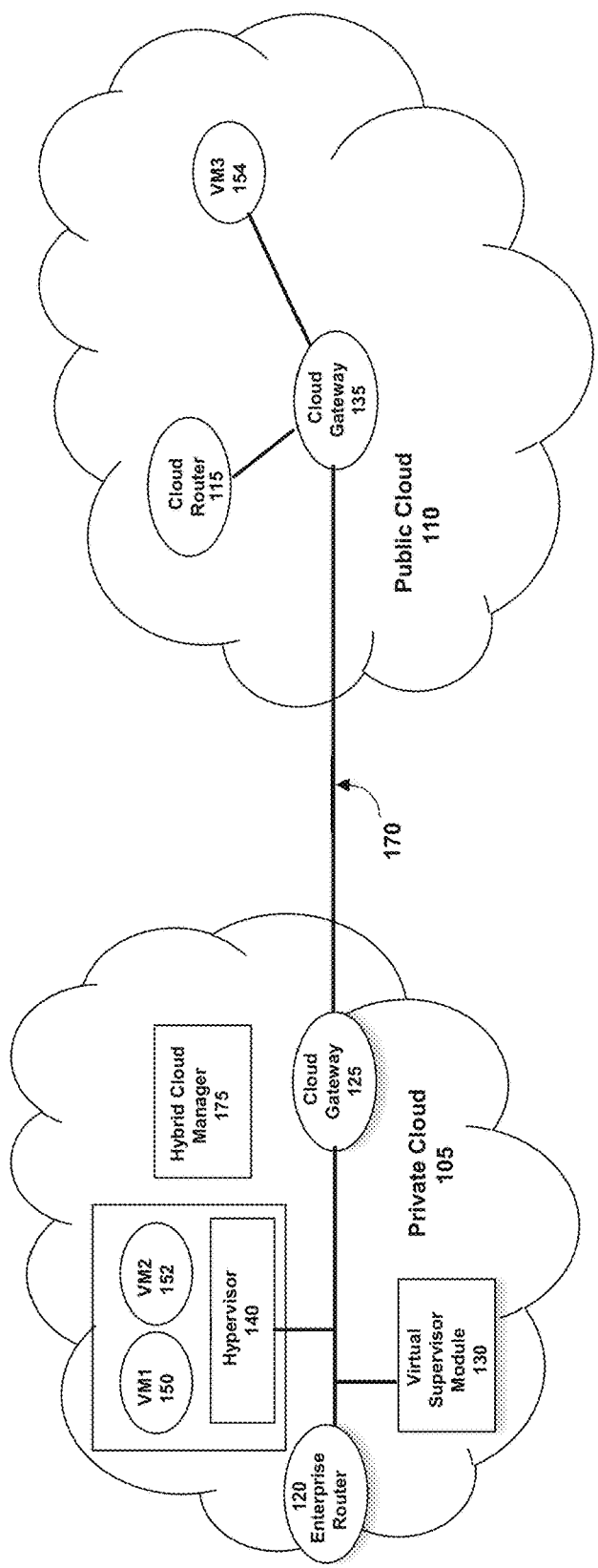
FIG. 1 illustrates an example hybrid cloud environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In some embodiments, the present technology may receive a request from a first cloud network of a hybrid cloud environment to transmit data to a second cloud network of the hybrid cloud environment, wherein the request may include a security profile related to the data. The security profile can be automatically analyzed to determine access permissions related to the data. Moreover, based at least in part on the access permissions, the data may be allowed to access to the second cloud network.

Description

A communication network can include a system of hardware, software, protocols, and transmission components that collectively allow separate devices to communicate, share data, and access resources, such as software applications. More specifically, a computer network may be a geographically distributed collection of nodes interconnected by communication links and segments for transporting data between end points, such as personal computers, portable devices, and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs may connect nodes over dedicated private communications links located in the same general physical location, such as a building or campus. WANs, on the other hand, may connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes can communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points, which can effectively extend the size or footprint of the network.

Networks can be segmented into sub-networks to provide a hierarchical, multilevel routing structure. For example, a network can be segmented into VLAN sub-networks using subnet addressing to create network segments. This way, a network can allocate various groups of IP addresses to specific network segments and divide the network into multiple logical networks. In a hybrid cloud environment, different sub-networks may be allocated to different parts of the hybrid cloud environment. For example, one or more VLAN sub-networks may be allocated to a private cloud network of the hybrid cloud environment and a public cloud network of the hybrid cloud environment based on security permissions associated with the one or more VLAN sub-networks.

Other networks, such as virtual networks (e.g., VLANs) are also available. For example, one or more LANs can be logically segmented to form a VLAN and allow a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN tunnels, as is appreciated by those skilled in the art. In a hybrid cloud computing environment, such a tunnel may include encryption and/or firewalls at either end of the tunnel to serve as a gatekeeper for data transmitted between a private data center (DC)/private cloud network and a public cloud network such as a cloud network provided by a commercial entity. Example public cloud networks are the Microsoft Azure® Cloud, Amazon Web Services®, Oracle® Cloud, and the like.

The various networks can include various hardware or software appliances or nodes to support data communications, security, and provision services. For example, networks can include routers, hubs, switches, APs, firewalls, repeaters, intrusion detectors, servers, VMs, load balancers, application delivery controllers (ADCs), and other hardware or software appliances. Such appliances can be distributed or deployed over one or more physical, overlay, or logical networks. Moreover, appliances can be deployed as clusters, which can be formed using layer 2 (L2) and layer 3 (L3) technologies. Clusters can provide high availability, redundancy, and load balancing for flows associated with specific appliances or nodes. A flow can include packets that have the same source and destination information. Thus, packets originating from device A to service node B can all be part of the same flow.

Appliances or nodes, as well as clusters, can be implemented in cloud deployments. Cloud deployments can be provided in one or more networks to provision computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, network devices, applications, virtual machines (VMs), services, and so forth. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc. Also, services may include various types of services, such as monitoring services, management services, communication services, data services, bandwidth services, routing services, configuration services, wireless services, architecture services, etc.

Cloud controllers and/or other cloud devices can be configured for cloud management. These devices can be pre-configured (i.e., come "out of the box") with centralized management, layer 7 (L7) device and application visibility, real time web-based diagnostics, monitoring, reporting, management, and so forth. As such, in some embodiments, the cloud can provide centralized management, visibility, monitoring, diagnostics, reporting, configuration (e.g., wireless, network, device, or protocol configuration), traffic distribution or redistribution, backup, disaster recovery, control, and any other service. In some cases, this can be done without the cost and complexity of specific appliances or overlay management software.

The present technology may address a need in the art for added security in hybrid cloud computing and storage environments ("hybrid cloud"). A hybrid cloud can refer to a cloud network architecture comprised of two or more cloud networks that communicate and/or share data. A hybrid cloud can be an interaction between private and public clouds where a private cloud connects to a public cloud and utilizes public cloud resources in a secure and scalable way. The hybrid cloud model can provide advantages over other cloud models. For example, the hybrid cloud model allows enterprises to protect their existing investment, maintain control of their sensitive data and applications, and maintain control of their network, processing, and storage resources. Additionally, hybrid clouds may allow enterprises to scale their environment as their demand for processing resources and storage increase or decrease. This scaling up or down can occur with minimal to no effect on existing physical network resources such as on-site, physical servers.

While some applications are suitable for traditional physical enterprise data centers/private networks, there are others whose dynamic compute requirements make them ideal for cloud-based deployment. For such applications, a goal is to take advantage of the computing elasticity and economics of cloud computing without sacrificing the security that data assets (e.g., databases, directories, repositories) gain from being located on site within an enterprise's data center. To be a viable hybrid cloud solution, data should be kept secure, applications should not need to be redesigned, and cloud networks should be readily mobile.

FIG. 1 illustrates an example hybrid cloud computing and storage network illustratively comprising a plurality of cloud networks or "clouds," including a private cloud 105 (e.g., enterprise data centers) and a public cloud 110 which may be utilized in a publicly-accessible network such as the Internet (not shown). Although current terminology refers to a hybrid cloud comprising a private cloud and a public cloud, it should be understood that many aspects of this disclosure can be practiced in various multi-cloud configurations (e.g., two clouds hosted by third party providers or two enterprise clouds in different locations). The private data center/private cloud 105 and public cloud 110 can be connected via a communication link 170 between private cloud gateway 125 and public cloud gateway 135. Data packets and traffic can be exchanged among the devices of the hybrid cloud network using predefined network communication protocols as will be understood by those skilled in the art.

As depicted in FIG. 1, each cloud network can have a cloud gateway such as private cloud gateway 125 and public cloud gateway 135. Each cloud network may also contain at least one virtual machine (VM) and/or nested VM containers. For example, FIG. 1 illustrates VM1 150 and VM2 152 in private cloud 105 and VM3 154 in public cloud 110. Private cloud gateway 125 can be configured as a VM-based gateway running in private cloud 105 that may be responsible for establishing communication link 170 for communication and data transfer between private cloud 105 and public cloud 110. Moreover, public cloud gateway 135 may be configured as a VM-based gateway running in public cloud 110 that can be responsible for establishing communication link 170 for communication and data transfer between private cloud 105 and public cloud 110.

Moreover, security group tags associated with private cloud gateway 125 and public cloud gateway 135 can enhance hybrid cloud network security by preventing data from reaching unauthorized areas of the hybrid cloud or preventing data from leaving areas of the hybrid cloud which the data is restricted to. In some embodiments, private cloud gateway 125 can screen requests for data stored in private cloud 105 destined for public cloud 110 by utilizing security group tags associated with, for example, sub-net VLANs from public cloud 110 that are authorized to receive data from private cloud 105 by virtue of access permissions associated with the sub-net VLANs from public cloud 110. This can prevent unauthorized data from leaving private cloud 105 by denying a request for data in private cloud 105 if, for example, the sub-net VLAN from public cloud 110 that makes the request does not have a security tag with access permissions to the requested data in private cloud 105.

Likewise, in some embodiments, public cloud gateway 135 can screen requests for data stored in public cloud 110 destined for private cloud 105 by utilizing security group tags associated with, for example, sub-net VLANs from public cloud 110 that are authorized to receive data from private cloud 105 by virtue of access permissions associated with the sub-net VLANs from public cloud 110. This can prevent unauthorized data from leaving public cloud 110 by not allowing the requested data from public cloud 110 to leave public cloud 110 if, for example, the sub-net VLAN from public cloud 110 related to the requested data does not have a security tag with access permissions to private cloud 105.

In some embodiments, one or more firewalls may be used in conjunction with private cloud gateway 125 and public cloud gateway 135 to facilitate screening of requests for entry and exit from private cloud 105 and public cloud 110. For example, private cloud gateway 125 and public cloud gateway 135 may complement each other by preventing entry of unauthorized data into their respective cloud networks and also preventing data from leaving their respective cloud networks if that data was not authorized to leave the cloud network due to insufficient access permissions for an intended destination (for example, a different cloud network of the hybrid cloud environment). In some embodiments, private cloud gateway 125 and public cloud gateway 135 may only prevent entry of unauthorized data into their cloud networks. In other embodiments, private cloud gateway 125 and public cloud gateway 135 may only prevent unauthorized data from leaving their respective cloud networks.

FIG. 1 also illustrates a hybrid cloud manager 175 within the private cloud 105 which can be a management plane VM for auto-provisioning resources within the hybrid cloud environment. Specifically, the hybrid cloud manager 175 may be a management platform (which could be a VM) operating in private cloud 105 or public cloud 110 (not shown), and may be generally responsible for providing the hybrid cloud environment operations, translating between private cloud network and public cloud network interfaces, management of cloud resources, dynamic instantiating of cloud gateways and cloud VM components (for example, VM3 154 in public cloud 110) through, for example, the private virtualization platform and public cloud provider APIs. It may also health-monitor the components of the hybrid cloud environment (e.g., the cloud gateways, the one or more private application VMs, and the communication link 170, and provide high availability of those components.

FIG. 1 also illustrates a virtual supervisor module 130 (for example, the Nexus 1000V Switch by Cisco Systems, Inc.), a hypervisor 140 (also called a virtual machine manager) and one or more VM 150, 152. The virtual supervisor module 130 in the private cloud 105 can be used to create VMs in the public cloud 110 or private cloud 105, such as VM1 150, VM2 152, and VM3 154. Each VM can host a private application, even VM3 154 in the public cloud 110 can host a private application such that VM3 154 in the public cloud 110 executes as if it were within the private cloud 105. The hypervisor 140 can be configured by the virtual supervisor module 130 and may provide an operating system for one or more VMs.

FIG. 1 also illustrates communication link 170. Communication link 170 can take several forms to include a type of virtual private network (VPN) or a tunnel. Specifically, some embodiments may utilize an open VPN overlay or else an IP security (IPSec) VPN based L3 network extension to provide communication link 170. While offering secure transport connections in a cloud environment, a VPN may not provide a switch infrastructure for providing features such as switching network traffic locally at the cloud, providing consistent enterprise network polices, allowing insertion of various network services (e.g., load balancers, firewalls, etc.), and construction of a sophisticated network topology (e.g., the current systems are connected through a router and multiple VLANs). While IPsec-VPN-based technology can provide customers inter-datacenter network connectivity and relatively sophisticated network topologies, it can only extend the enterprise network at the network layer (Layer 3 or "L3" of the illustrative and well-known OSI model). This implies that the overlay networks created at the cloud datacenter (public cloud 110) can be a set of new subnets, where VMs in the public cloud are assigned with new network identities (e.g., IP and MAC addresses). Because of this, many enterprise infrastructures (e.g., access control lists, firewall policies, domain name services, etc.) can be modified in order for the newly attached VM systems to be able to work with rest of the enterprise systems. For example, the IPSec VPN tunnel may prevent penetration of corporate firewalls and Network Address Translation (NAT) devices deep within the enterprise data center (for example, private cloud 105).

Some hybrid cloud technologies, such as embodiments of the presently described technology, can utilize a secure transport layer (e.g., Layer 4 or "L4") tunnel as the communication link 170 between a first cloud gateway 125 in a private cloud 105 and a second cloud gateway 135 in a public cloud 110, where the secure transport layer tunnel is configured to provide a link layer 170 (e.g., Layer 2 or "L2") network extension between the private cloud and the public cloud. By establishing a secure transport layer (L4) tunnel 170 (e.g., transport layer security (TLS), datagram TLS (DTLS), secure socket layer (SSL), etc.) over the public cloud network 110, the techniques herein may build a secure L2 switch overlay that interconnects cloud resources (public cloud 110) with private cloud 105 (e.g., enterprise network backbones). In other words, the secure transport layer tunnel 170 can provide a link layer network extension between the private cloud 105 and the public cloud 110.

As noted, the cloud gateway 125 deployed at the private cloud 105 can use an L4 Secure Tunnel to connect to the cloud resources allocated at public cloud 110. The L4 secure tunnel is well-suited for use with corporate firewalls and NAT devices due to the nature of the transport level protocols (e.g., UDP/TCP) and the transport layer ports opened for HTTP/HTTPS in the firewall. The L2 network may extend and connect to each of the cloud VMs, e.g., VM1 150, VM2 152, VM3 154 through the cloud gateway 135 deployed at the public cloud 110. With an L2 network overlay, all instances of a particular private application VM, e.g, VM3 154 can be seamlessly migrated to the overlay network dynamically created at the public cloud, without any impacts to the existing corporate infrastructure.

As a general practice, a public cloud service provider offers only a limited number of network attachments for each of the cloud VMs, e.g., VM3 154, and network broadcasting capability. This can prevent enterprise customers from migrating their multi-VLAN network architectural environment into the public cloud datacenter. However, building an L2 network overlay on top of L4 tunnels as described herein reduces the network attachments requirements for cloud VMs and may provide cloud VMs with network broadcasting ability. The techniques herein can allow enterprise customers to deploy consistent enterprise-wide network architectures, even in a hybrid cloud network environment.

Figure 2:
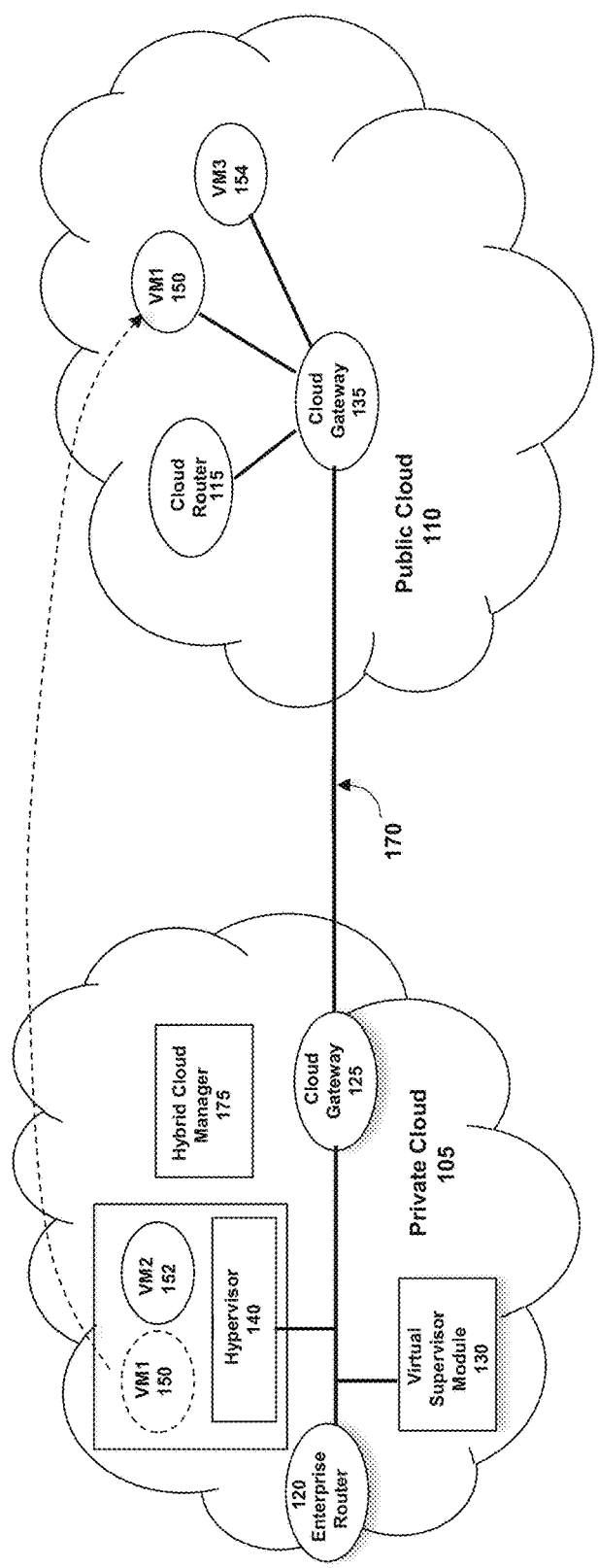
FIG. 2 illustrates an example of migrating a virtual machine in a hybrid cloud environment.

FIG. 2 illustrates a hybrid cloud environment as illustrated in FIG. 1 being used to migrate a VM from private cloud 105 to public cloud 110. In some embodiments, a VM on the private cloud may need to be scaled beyond the current resources of the private cloud or the private cloud may need to be taken off line for a period of time. In some embodiments, it can be desirable to migrate an application on the private cloud 105 to the public cloud 110 or from public cloud 110 to private cloud 105 (not shown). FIG. 2 illustrates VM1 150 on private cloud 105 being migrated to public cloud 110. Migration can be managed using virtual supervisor module 130 to take VM1 150 offline, and may be migrated using hybrid cloud manager 175 to copy the VM1 150 disk image to public cloud 110, and instantiate it in the public cloud 110.

Figure 3:
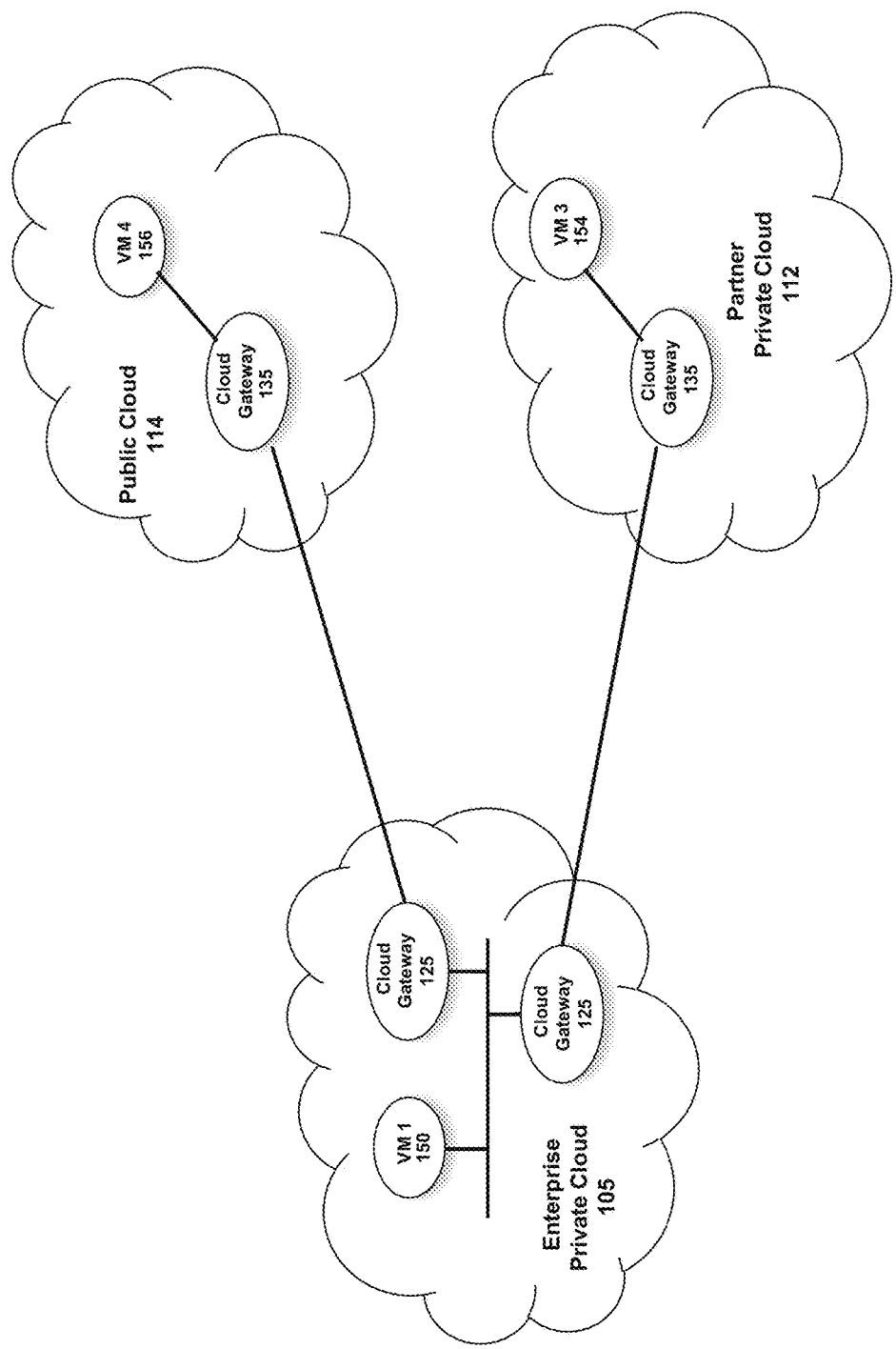
FIG. 3 illustrates an example hybrid cloud environment with multiple cloud networks.

FIG. 3 illustrates an example hybrid cloud environment. In FIG. 3, a public cloud 114 can be running, for example, an application or service in VM4 156. The application or service can be shared by the enterprise private cloud 105 and partner private cloud 112. In some embodiments, private cloud 114 can act as an intermediary that provides limited access to the enterprise and the partner. It should be understood that many other hybrid cloud network architectures may be utilized besides the example architecture of FIG. 3. In some embodiments, a hybrid cloud network may include one or more enterprise private clouds, one or more physical enterprise servers, one or more public clouds, one or more physical public network servers, or any combination of such clouds and servers. In addition, embodiments of the present technology can provide for the secure migration of data, virtual machines, etc. among all of the different cloud networks (public and private) and physical servers in a hybrid cloud computing environment. For example, VM4 156 may be migrated to enterprise private cloud 105 and/or partner private cloud 112. Likewise, some embodiments can provide for the migration of, for example, VM3 to enterprise private cloud 105 and/or public cloud 114.

Figure 4:
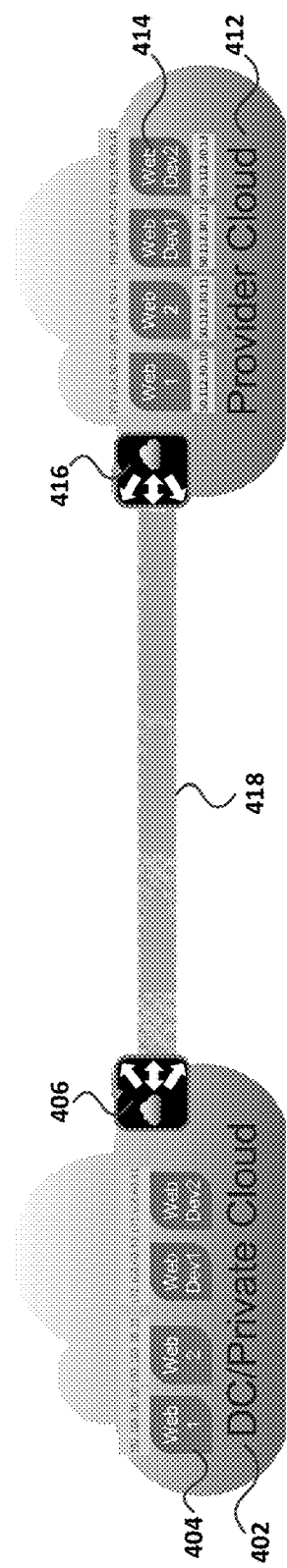
FIG. 4 illustrates an example hybrid cloud environment utilizing cloud security groups.

FIG. 4 illustrates an example hybrid cloud environment. Data Center (DC)/private cloud 402 may be connected to provider/public cloud 412 via secure communication link 418. Private cloud 402 can be a cloud-based network designated for a particular enterprise. Private cloud 402 may contain sensitive data that is not intended to be shared outside of private cloud 402 without authorized access. Provider cloud 412 may be a publicly-accessible cloud-based network that is provided by a third party commercial vendor such as Oracle®, Amazon®, Microsoft®, etc. Item 404 represents one of many sub-nets, VLAN sub-nets, virtual machines, or other data that can be stored in data center/private cloud 402. Likewise, item 414 represents one of many sub-nets, VLAN sub-nets, virtual machines, or other data that can be stored in provider cloud 412. Items 406 and 416 can represent enforcements points for security policies/hybrid cloud security groups which may dictate the entry and exit of data/applications/VMs from private cloud 402 and provider/public cloud 412.

For example, items 406 and 416 may be gateways which are utilized to enforce hybrid cloud security groups/security policies. Hybrid cloud security groups can be automatically applied to data/applications/VMs that appear in the hybrid cloud network so that the data/applications/VMs are grouped according to authorized hybrid cloud access locations. For instance, an application represented by item 404 may be requested for migration to provider cloud 412. If VM 404 does not have the appropriate security group tag to exit private cloud 402 and enter provider cloud 412, gateway 406 can prevent VM 404 from leaving private cloud 402.

If VM 404 does have the appropriate security group tag to exit private cloud 402 and enter provider cloud 412, gateway 406 can allow VM 404 to leave private cloud 402 via secure link/tunnel 418. VM 404 may also have its data copied and instantiated in provider/public cloud 412 in some embodiments. Gateway 416 can act as a gatekeeper, in some embodiments only permitting data from an authorized security group to enter provider/public cloud 412. Secure link 418 may be secured with cryptography such that the communications between private cloud 402 and public cloud 412 are not detectable to outside parties. Furthermore, in some embodiments, secure link/secure tunnel 418 may not allow access to or from the Internet in order to enhance security by transmitting all sensitive data/applications/VMs via secure link 418 only.

Hybrid cloud security groups may be configured manually by an administrator of the private cloud 402 and/or public cloud 412. For instance, an administrator of private cloud 402 may configure the present technology to automatically apply security group tags to data/applications/VMs on the basis of, for example, origin IP address, type, author, date created, etc. Upon instantiation of an embodiment of the present technology, all or some of the data/applications/VMs may be assigned to one or more cloud security groups. For example, some data/applications/VMs can be authorized for use by the private cloud, the public cloud only, or both the private and public clouds. This can allow for greater flexibility of movement of data inside a particular cloud environment while preserving security because all data that has a cloud security group tag should only be permitted in authorized areas associated with their respective cloud security group(s).

Figure 5:
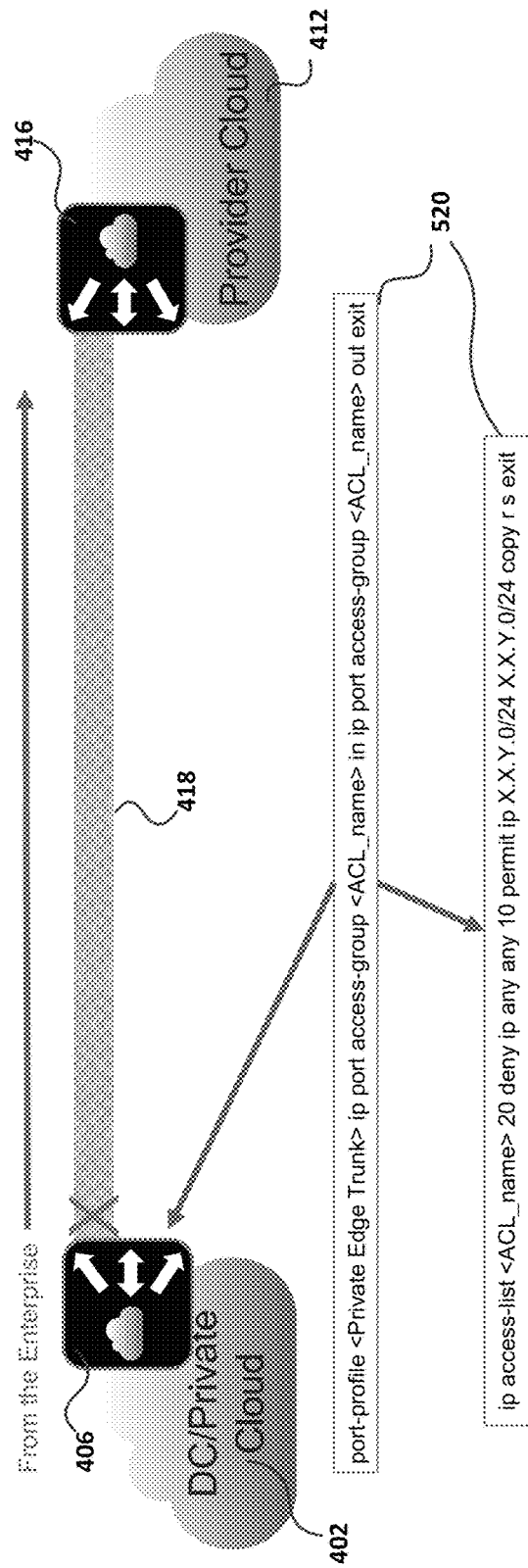
FIG. 5 illustrates an example hybrid cloud environment utilizing cloud security groups.

FIG. 5 illustrates an example hybrid cloud environment. As in FIG. 4, the example embodiment of FIG. 5 can include data center/private cloud 402, provider/public cloud 412, and secure link/tunnel 418. FIG. 5 illustrates an example application of hybrid cloud security groups wherein data/applications/VMs (not shown) are requesting exit from private cloud 402 in order to enter provider/public cloud 412. As discussed with respect to FIG. 4, private cloud gateway 406 can verify that any data, applications, VMs, etc. attempting to exit the private cloud 402 are authorized to leave private cloud 402.

For example, programming code 520 may provide private cloud gateway 406 with parameters for authorized entry/exit from private cloud 402. It is understood that programming code 520 may be implemented in many other forms besides that shown in FIG. 5. Moreover, embodiments of the present technology may utilize one or more programming languages to determine parameters for different hybrid cloud security groups. In some embodiments, programming code 520 may provide for entry parameters and/or exit parameters of private cloud 402. FIG. 5 illustrates that, in some embodiments, data may not be permitted to leave private cloud 402 if the hybrid cloud security group tag associated with the data, based on parameters that may be defined by an administrator, does not authorize exit from private cloud 402. For example, if an application from private cloud 402 is not a part of a selected subnet that has a security group tag allowing for exit from private cloud 402, the application will be denied exit from private cloud 402 as shown at private cloud gateway 406.

In other embodiments, if data requested from private cloud 402 has a security group tag authorizing exit from private cloud 402, based on an allowed subnet, said data may be transmitted to provider public cloud 412 via secure tunnel 418. Some embodiments may provide for similar screening of transmitted data at provider public gateway 416 in order to ensure that the data is part of an authorized security group for access into provider public cloud 412. It is understood that a request for data from private cloud 402 may come from within private cloud 402, within provider public cloud 412, or from a third party/parties.

Figure 6:
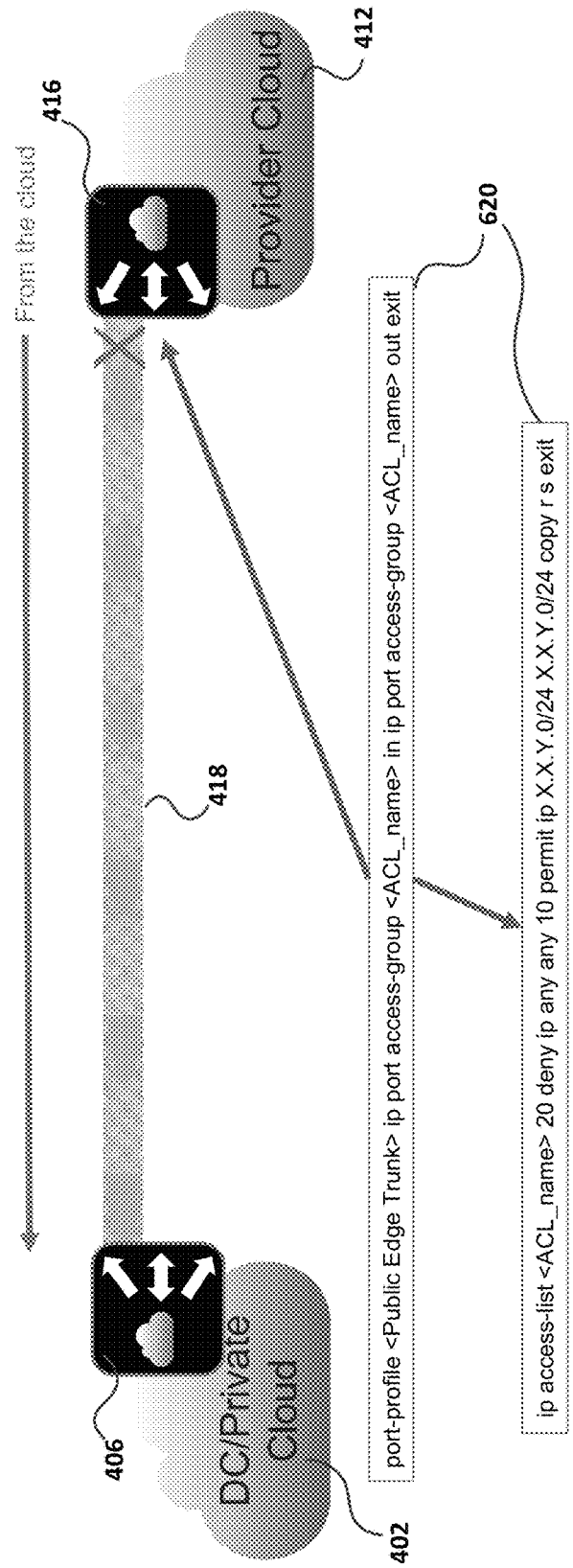
FIG. 6 illustrates an example hybrid cloud environment utilizing cloud security groups.

FIG. 6 illustrates an example hybrid cloud environment. As in FIG. 4, the example embodiment of FIG. 6 can include data center/private cloud 402, provider/public cloud 412, and secure link/tunnel 418. FIG. 6 illustrates an example application of hybrid cloud security groups wherein data/applications/VMs (not shown) are requesting exit from provider public cloud 412 in order to enter private cloud 402. As discussed with respect to FIG. 4, public cloud gateway 416 can verify that any data, applications, VMs, etc. attempting to exit the public cloud 412 are authorized to leave public cloud 412.

For example, programming code 620 may provide public cloud gateway 416 with parameters for authorized entry/exit from public cloud 412. It is understood that programming code 620 may be implemented in many other forms besides that shown in FIG. 6. Moreover, embodiments of the present technology may utilize one or more programming languages to determine parameters for different hybrid cloud security groups. In some embodiments, programming code 620 may provide for entry parameters and/or exit parameters of public cloud 412. FIG. 6 illustrates that, in some embodiments, data may not be permitted to leave public cloud 412 if the hybrid cloud security group tag associated with the data, based on parameters that may be defined by an administrator, does not authorize exit from public cloud 412. For example, if an application from public cloud 412 is not a part of an extended VLAN that has a security group tag allowing for entry into private cloud 402 from public cloud 412, the application will be denied exit from public cloud 412 as shown at public cloud gateway 416.

In other embodiments, if data requested from public cloud 412 has a security group tag authorizing exit from public cloud 412, based on an allowed extended VLAN, said data may be transmitted to private cloud 402 via secure tunnel 418. Some embodiments may provide for similar screening of transmitted data at private gateway 406 in order to ensure that the data is part of an authorized security group for access into private cloud 402. It is understood that a request for data from provider public cloud 412 may come from within provider public cloud 412, within private cloud 402, or from a third party/parties.

Figure 7:
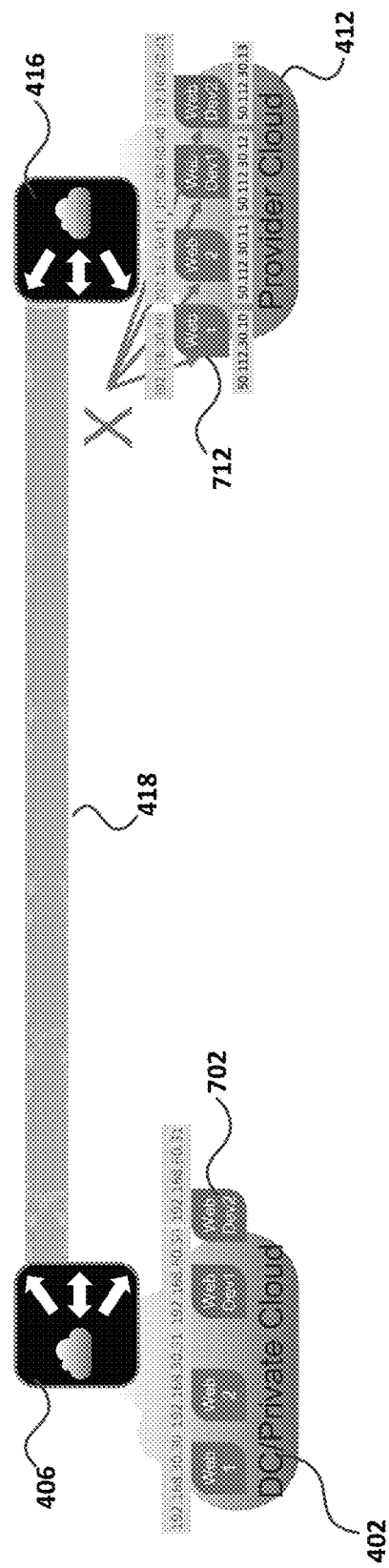
FIG. 7 illustrates an example hybrid cloud environment utilizing cloud security groups.

FIG. 7 illustrates an example hybrid cloud environment. As in FIG. 4, the example embodiment of FIG. 7 can include data center/private cloud 402, provider/public cloud 412, and secure link/tunnel 418. FIG. 7 illustrates an example application of hybrid cloud security groups wherein an instance (not shown) of the hybrid cloud environment is screened for authorization based on the security group associated with the instance. For example, FIG. 7 shows instance 702 attempting access to provider public cloud 412. Instance 702 does not have a security group tag authorized for entry into provider public cloud 412. Thus, public cloud gateway 416 denies access to instance 702 such that instance 702 is not allowed to reach hybrid VM 712. On the other hand, if an instance from private cloud 402 has a security group tag authorizing exit from private cloud 402 and entry into public cloud 412, the instance may be transmitted to provider public cloud 412 via secure tunnel 418.

In some embodiments, the present technology can utilize the security structure of the provider public cloud in order to enhance security. For example, if the provider public cloud has its own security parameters/security groups for data entering the public cloud (e.g., Amazon AWS® security groups), embodiments of the present technology may apply those security parameters in place of or in addition to the security parameters of the hybrid cloud security group associated with the data requesting entry into the public cloud.

Figure 8:
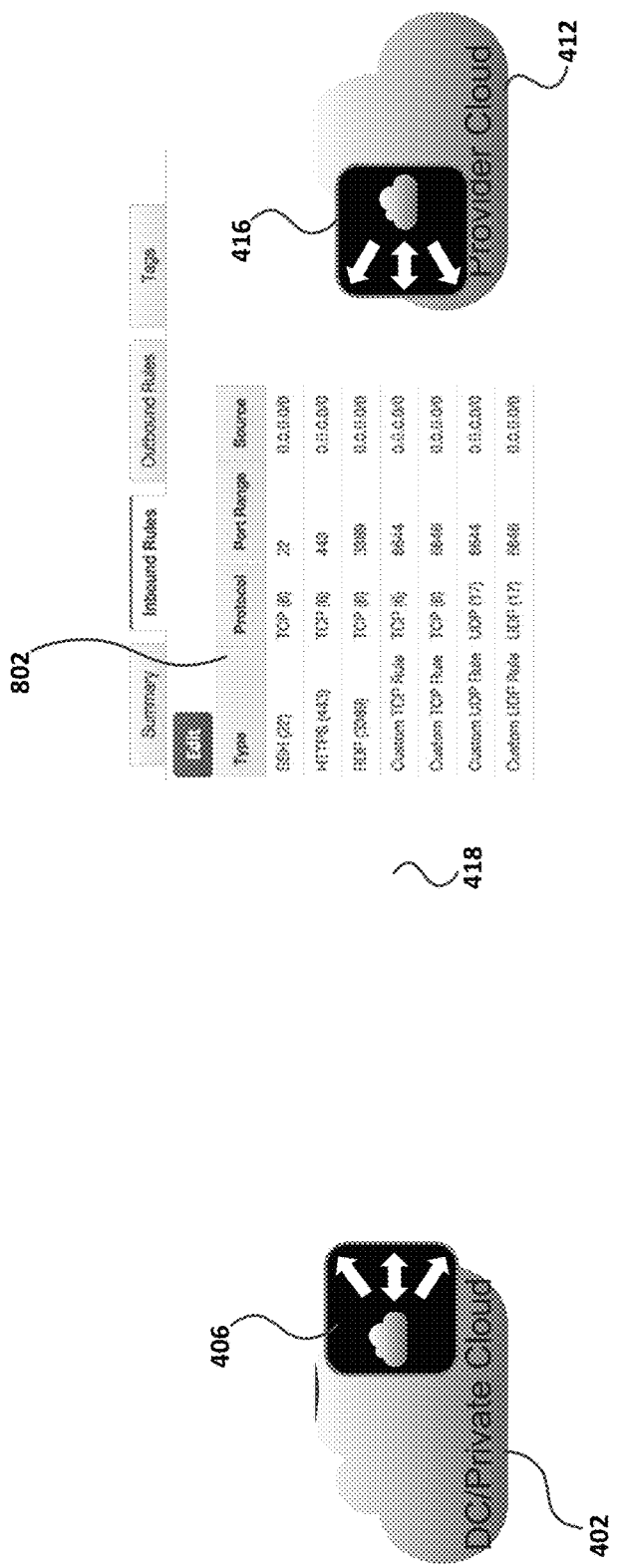
FIG. 8 illustrates an example hybrid cloud environment utilizing cloud security groups.

For example, FIG. 8 illustrates an example hybrid cloud environment utilizing security parameters/security group settings of a provider public cloud 412. As in FIG. 4, the example embodiment of FIG. 8 can include data center/private cloud 402, provider/public cloud 412, secure link/tunnel 418, and gateways 406 and 416. FIG. 8 illustrates example security parameters/security group settings 802. For example, security group settings 802 may be provided by Amazon AWS® and may complement the security features provided by the private cloud 402 security group settings by providing additional security requirements for entities requesting access to the provider public cloud 412. It is understood that many other security settings may be used besides what is shown in FIG. 8.

Figure 9:
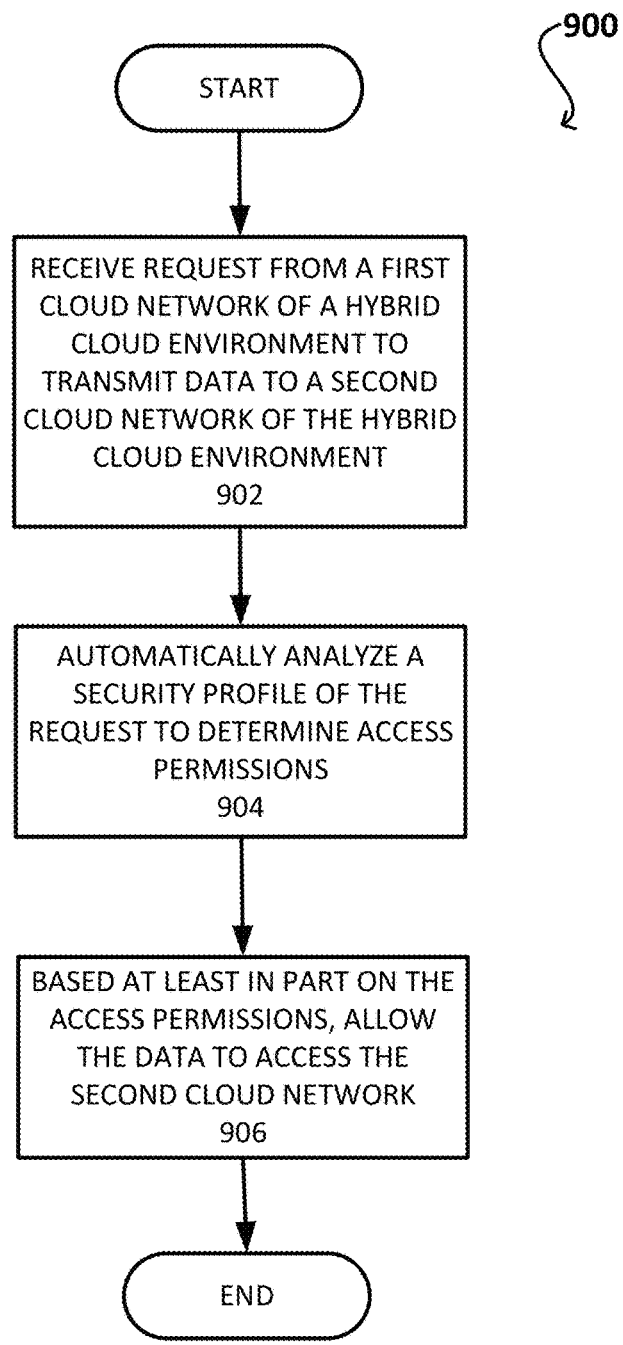
FIG. 9 illustrates an example process of the present technology.

FIG. 9 illustrates an example process 900 of the present technology. Process 900 begins at 902 where a request is received from a first cloud network of a hybrid cloud environment to transmit data to a second cloud network of the hybrid cloud environment. Process 900 continues at 904 where a security profile of the request is automatically analyzed to determine access permissions. Example process 900 concludes at 906 where, based at least in part on the access permissions, the data is allowed to access the second cloud network of the hybrid cloud environment. It is understood that embodiments of the present technology may include fewer or more steps than process 900.

Figure 10:
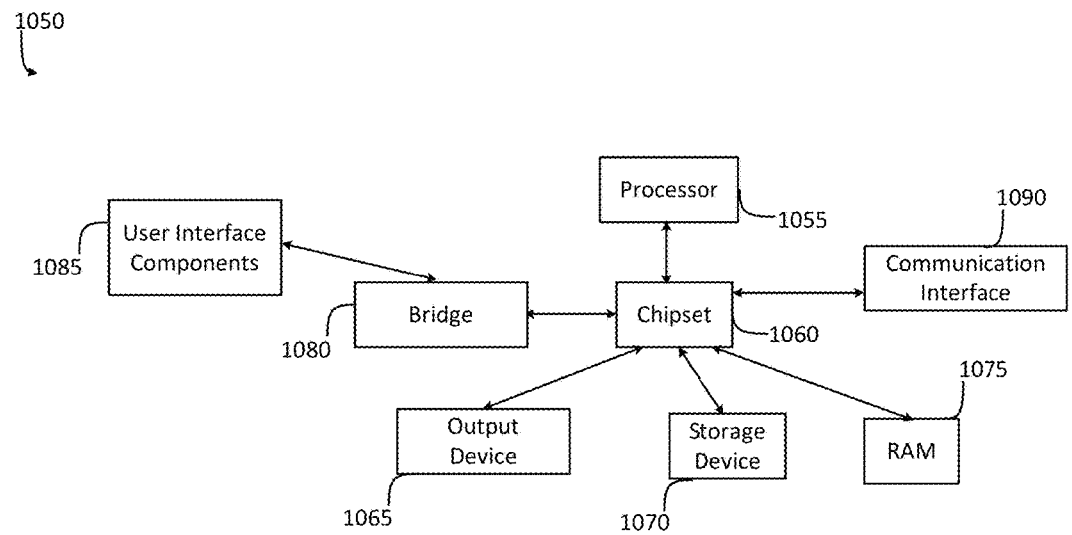
FIG. 10 illustrates an example architecture of the present technology.

FIG. 10 illustrates an example computer system 1050 having a chipset architecture that can be used in executing embodiments of the present technology and generating and displaying a graphical user interface (GUI). Computer system 1050 is an example of computer hardware, software, and firmware that can be used to implement embodiments of the disclosed technology. System 1050 can include a processor 1055, representative of any number of physically and/or logically distinct resources capable of executing software and/or firmware, and utilizing hardware configured to perform identified computations. Processor 1055 can communicate with a chipset 1060 that can control input to and output from processor 1055. In some embodiments, chipset 1060 outputs information to output 1065 (for example, a display) and can read and write information to storage device 1070 (for example, magnetic media and solid state media). Chipset 1060 can also read data from and write data to RAM 1075. In some embodiments, a bridge 1080 may be utilized by chipset 1060 for interfacing with a variety of user interface components 1085. Such user interface components 1085 can include a keyboard, a microphone, touch detection and processing circuitry, a pointing device, such as a mouse, and the like. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the system itself by processor 1055 analyzing data stored in storage 1070 or 1075. Further, the system can receive inputs from a user via user interface components 1085 and execute appropriate functions, such as browsing functions by interpreting these inputs using processor 1055.

It can be appreciated that example system 1050 can have more than one processor 1055 or be part of a group or cluster of computing devices networked together to provide greater processing and/or storage capabilities.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and the like.

Devices implementing methods according to these disclosures can comprise hardware, firmware, and/or software, and can use a variety of arrangements or form factors. Typical examples of such form factors include laptops, smart phones, small form factor personal computers, personal digital assistants, rackmount devices, standalone devices, and the like. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The techniques disclosed herein can provide increased security with respect to network resources and data in a hybrid cloud environment. Embodiments of the present technology can prevent harmful and/or unauthorized entities from entering the hybrid cloud network environment, which may result in more efficient network routing and high availability of network applications and systems, which in turn may result in fewer processor cycles required to route signals and thus improved efficiency and extended service life of the network processors used to implement some embodiments of the present technology. Thus, the present technology may improve related hardware used in its implementation.

Further, although the foregoing description has been directed to specific embodiments, it will be apparent that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include cloud-based media, magnetic or optical disks, flash memory, USB devices provided with non-volatile memory, networked storage devices, and the like. In addition, devices implementing methods according to these disclosures can comprise hardware, firmware and/or software, and can take any of a variety of form factors. Typical examples of such form factors include laptops, smart phones, tablets, wearable devices, small form factor personal computers, personal digital assistants, and the like. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving a request from a first cloud network of a hybrid cloud environment at a gateway of a second cloud network of the hybrid cloud environment to transmit data from the second cloud network;
   automatically analyzing a security tag associated with the data, at the gateway of the second cloud network, to yield an access determination, the automatically analyzing including an analysis of whether the security tag includes any access permissions to the data, the access permissions indicating that the data is allowed to enter the first cloud network; and
   based at least in part on the access determination and if the security tag includes the access permissions indicating the data is allowed to enter the first cloud network, allowing the data to exit the second cloud network via the gateway, the hybrid cloud environment configured to prevent unauthorized access to the hybrid cloud environment while providing scalability to accommodate increases and decreases in demand for one or more computing resources, the one or more computing resources including a processing device.

2. The method of claim 1, further comprising:
   screening the request via a firewall of the second cloud network; and
   based at least in part on the access determination, denying access to data that is not permitted to exit the second cloud network.

3. The method of claim 1, further comprising:
   transmitting the data from the second cloud network via a hybrid link, the hybrid link utilized for secure communications between the first cloud network and the second cloud network, wherein the hybrid link does not allow connection to the Internet.

4. The method of claim 1, wherein the security tag is automatically applied to applications initialized in the hybrid cloud environment.

5. The method of claim 1, further comprising:
   receiving a request for a virtual machine in the hybrid cloud environment;
   determining that the request originates from an Internet Protocol (IP) address of a private cloud network of the hybrid cloud environment; and
   providing the virtual machine in the hybrid cloud environment.

6. The method of claim 1, further comprising:
   receiving a request for access to a private cloud network of the hybrid cloud environment from a public cloud network of the hybrid cloud environment;
   automatically determining that the request for access to the private cloud network is from an entity with permission to operate in the private cloud network; and
   based at least in part on the permission, allowing access to the private cloud network.

7. The method of claim 1, further comprising:
   receiving a request for access to a public cloud network of the hybrid cloud environment from a private cloud network of the hybrid cloud environment;
   automatically determining that the request for access to the public cloud network is from an entity with permission to operate in the public cloud network; and
   based at least in part on the permission, allowing access to the public cloud network.

8. A network device comprising:
   one or more servers facilitating a first cloud network of a hybrid cloud environment;
   one or more servers facilitating a second cloud network of the hybrid cloud environment;
   one or more processors; and
   a memory configured to store non-transitory computer-readable instructions, which when executed by the one or more processors, cause the one or more processors to:
   receive a request from the first cloud network of the hybrid cloud environment to transmit data from the second cloud network of the hybrid cloud environment;
   automatically analyze a security tag associated with the data to determine whether the security tag includes any access permissions to the data and yield an access determination, the access permissions indicating that the data is allowed to enter the first cloud network; and
   based at least in part on the access determination and if the security tag includes the access permissions indicating the data is allowed to enter the first cloud network, allow the data to exit the second cloud network, the hybrid cloud environment configured to prevent unauthorized access to the hybrid cloud environment while providing scalability to accommodate increases and decreases in demand for one or more computing resources.

9. The network device of claim 8, wherein the execution of the computer-readable instructions further cause the one or more processors to:
   based at least in part on the access determination, deny access to data that is not permitted to exit the second cloud network.

10. The network device of claim 8, wherein the execution of the computer-readable instructions further cause the one or more processors to:
    transmit the data from the second cloud network via a hybrid link, the hybrid link utilized for secure communications between the first cloud network and the second cloud network, wherein the hybrid link does not allow connection to the Internet.

11. The network device of claim 8, wherein the execution of the computer-readable instructions further cause the one or more processors to:
    receive a request for a virtual machine in the hybrid cloud environment;
    determine that the request originates from an Internet Protocol (IP) address of a private cloud network of the hybrid cloud environment; and provide the virtual machine in the hybrid cloud environment.

12. The network device of claim 8, wherein the execution of the computer-readable instructions further cause the one or more processors to:
receive a request for access to a private cloud network of the hybrid cloud environment from a public cloud network of the hybrid cloud environment;
automatically determine that the request for access to the private cloud network is from an entity with permission to operate in the private cloud network; and
based at least in part on the permission, allow access to the private cloud network.

13. The network device of claim 8, wherein the execution of the computer-readable instructions further cause the one or more processors to:
receive a request for access to a public cloud network of the hybrid cloud environment from a private cloud network of the hybrid cloud environment;
automatically determine that the request for access to the public cloud network is from an entity with permission to operate in the public cloud network; and
based at least in part on the permission, allow access to the public cloud network.

14. A non-transitory computer-readable medium having instructions encoded thereon, which when executed by one or more processors, cause the one or more processors to:
receive a request from a first cloud network of a hybrid cloud environment to transmit data from a second cloud network of the hybrid cloud environment;
automatically analyze a security tag associated with the data to determine whether the security tag includes any access permissions to the data and yield an access determination, the access permissions indicating that the data is allowed to enter the first cloud network; and
based at least in part on the access determination and if the security tag includes the access permissions indicating the data is allowed to enter the first cloud network, allow the data to exit the second cloud network, the hybrid cloud environment configured to prevent unauthorized access to the hybrid cloud environment while providing scalability to accommodate increases and decreases in demand for one or more computing resources.

15. The non-transitory computer-readable medium of claim 14, wherein the execution of the computer-readable instructions further cause the one or more processors to:
based at least in part on the access determination, deny access to data that is not permitted to exit the second cloud network.

16. The non-transitory computer-readable medium of claim 14, wherein the execution of the computer-readable instructions further cause the one or more processors to:
transmit the data from the second cloud network via a hybrid link, the hybrid link utilized for secure communications between the first cloud network and the second cloud network, wherein the hybrid link does not allow connection to the Internet.

17. The non-transitory computer-readable medium of claim 14, wherein the security tag is automatically applied to applications initialized in the hybrid cloud environment.

18. The non-transitory computer-readable medium of claim 14, wherein the execution of the computer-readable instructions further cause the one or more processors to:
receive a request for a virtual machine in the hybrid cloud environment;
determine that the request originates from an Internet Protocol (IP) address of a private cloud network of the hybrid cloud environment; and
provide the virtual machine in the hybrid cloud environment.

19. The non-transitory computer-readable medium of claim 14, wherein the execution of the computer-readable instructions further cause the one or more processors to:
receive a request for access to a private cloud network of the hybrid cloud environment from a public cloud network of the hybrid cloud environment;
automatically determine that the request for access to the private cloud network is from an entity with permission to operate in the private cloud network; and
based at least in part on the permission, allow access to the private cloud network.

20. The non-transitory computer-readable medium of claim 14, wherein the execution of the computer-readable instructions further cause the one or more processors to:
receive a request for access to a public cloud network of the hybrid cloud environment from a private cloud network of the hybrid cloud environment;
automatically determine that the request for access to the public cloud network is from an entity with permission to operate in the public cloud network; and
based at least in part on the permission, allow access to the public cloud network.

\* \* \* \* \*